United States Patent [19]
Sioli et al.

[11] 3,914,313
[45] Oct. 21, 1975

[54] METHOD FOR THE PRODUCTION OF CYCLOPENTAMETHYLENE KETENE

[75] Inventors: Giancarlo Sioli, Como; Luigi Giuffré, Milan; Franco Righi, Cesano Maderno; Giancarlo Matera, Milan, all of Italy

[73] Assignee: Snia Viscosa Societa' Nazionale Industria Applicazioni Viscosa S. p. A., Milan, Italy

[22] Filed: Feb. 25, 1971

[21] Appl. No.: 118,951

[52] U.S. Cl. .............................. 260/585.5; 260/547
[51] Int. Cl.² ........................................ C07C 45/18
[58] Field of Search ................................ 260/585.5

[56] References Cited
UNITED STATES PATENTS

| | | | |
|---|---|---|---|
| 2,688,635 | 9/1954 | Eberts et al. | 260/585.5 |
| 2,863,922 | 12/1958 | Sturzenegger | 260/585.5 |
| 3,366,689 | 1/1968 | Maeda et al. | 260/585.5 |

*Primary Examiner*—Norman P. Morgenstern
*Attorney, Agent, or Firm*—Shlesinger, Fitzsimmons & Shlesinger

[57] ABSTRACT

A method is disclosed for the preparation of alicyclic ketenes, useful as intermediates in the preparation of lactams. The instant method consists in a heat treatment of an alicyclic acid, or its anhydride, in a matallic reactor exempt from nickel, at high temperatures but under subatmospherical pressures. A catalyst of the type $XP(OR)_3$ wherein X is selected from the group consisting of oxygen, sulphur and selenium and R is an alkyl radical is preferred for accelerating the reactions. The temperatures are in the range from 550° to 750°C and the preferred pressure is under 100 millimeters of mercury. High yields and conversion rates are obtained and the purity of the end product is more than satisfactory. The method can be applied to the preparation of a number of alicyclic ketenes.

5 Claims, No Drawings

METHOD FOR THE PRODUCTION OF CYCLOPENTAMETHYLENE KETENE

This invention relates to a method for the preparation of alicyclic ketenes, this term being intended to connote the compounds in which the carbonyl grouping is directly bound to a carbon atom of the unsubstituted cycloaliphatic ring, that is, compounds of the general formula:

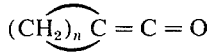

$$(CH_2)_n \overbrace{C} = C = O$$

Such compounds can be used, for example, for the preparation of lactams, these being industrially important compounds for the preparation of polymers adapted to be converted into fibres, plastics materials and the like, or other products having a wide range of industrial applications.

The prior art has disclosed the preparation on a laboratory scale only of cyclopentamethyleneketene, carried out by dehydrohalogenation of hexahydrobenzoyl chloride (Jour. Am. Chem. Soc., 75, page 2,765 (1953). This method is extremely intricate and is incapable of being properly transferred to an industrial scale: in addition, it gives quite unsatisfactory yields and the purity of the product is inadequate.

According to the invention, a method has been envisaged, whereby alicyclic ketenes are prepared with good yields, the reaction times being short, and the operative conditions are the most suitable ones for an industrial use of the subject method.

According to the method of the present invention, an alicyclic acid, or an anhydride thereof, is subjected to a heat treatment in metallic reactors at high temperatures and under a reduced pressure, which permits that the final ketene may be obtained with a high purity, with good yields and conversion ratios. More particularly, the subject method can be applied to the preparation of cyclopentamethyleneketene, a substance which has a great industrial importance, inasmuch as it can be converted into its corresponding lactam (epsilon-caprolactam) used in the production of polycaprolactam, or Nylon-6, from which fibres, plastics materials and the like are produced. The starting alicyclic acid is, in this case, hexahydrobenzoic acid.

However, the method according to the invention permits also that other ketenes be prepared, which belong to the family of alicyclic or cycloaliphatic ketenes, and, in general, the method and the reaction runs contemplated in it can be applied, as well, to the preparation of any ketene of the alicyclic series.

The method according to the invention is carried out in metallic reactors, generally copper vessels or vessels made of steel having a variable composition (such as steels containing chromium, manganese and other elements) which are capable of withstanding the action of reactants and the formed products, but substantially devoid of nickel.

The subject method can be carried out with the aid of appropriate catalysts which accelerate the reactions, other substances being possibly added to improve the catalyst efficiency by overcoming possibly detrimental side effects.

According to the invention, the alicyclic acid, or its anhydride, is subjected to heat treatment within a metallic reactor at a temperature ranging from 400° to 900°C, preferably between 550° and 750°C, under reduced pressures, preferably less than 100 millimeters of mercury (mmHg), gases and vapors being produced which are subsequently separated by fractional condensation. A few of the products thus obtained can possibly be subjected to heat treatment again in a metallic reactor, to give gases and vapors from which, by an appropriate condensation stage, the expected final ketene is obtained.

The metallic reactor to be employed is preferably made of copper or a special steel which contains chromium, manganese and other elements, but which is virtually devoid of nickel values.

The alicyclic acid used as the starting material is fed to a first reactor which is maintained under the temperature and pressure conditions outlined above, but preferably under a residual pressure of less than 100 mmHg and at a temperature from 550° to 750°C, the presence of a phosphorus-containing catalyst being preferred. Generally phosphoric acid esters of the type $XP(OR)_3$ are used, wherein the substituent X indicates oxygen, sulphur, selenium, and R is an alkyl radical.

The amounts of such catalysts which are used, as a rule, range from 0.1 percent to 2.5 percent by weight with respect to the starting acid used. The preferred amounts range between 0.3 percent and 1 percent.

According to a practicable embodiment of the method, it has been ascertained that the vapors emerging from the first reactor can be supplemented, with advantage, by small amounts of ammonia or aliphatic or heterocyclic amines (such as piridine) which prevent the occurrence of side reactions detrimental to the efficiency of the subject method. The amounts employed of these nitrogenous compounds range from 0.5 to 10 per thousand by weight with respect to the starting acid.

The vapors emerging from the first reactor are fed to a set of condensers (generally two or three) which are kept at decreasing temperatures so as to obtain a fractional condensation of said vapors. As a rule, the first condenser is kept at such temperatures that the unreacted starting acid vapors and the anhydride of said acid are condensed.

The vapors of the ketene formed during the reaction can go, at least partially, beyond the first condenser and be then properly cooled and separated. On the contrary, and frequently, the vapors of the ketene react thoroughly, once they come out of the first reactor, with a portion of the unreacted acid, thus producing the anhydride thereof, which is condensed together with the acid in the first condenser. In such a case, the vapors emerging from the first condenser consist of the water formed in the main reaction and of by-products, and are fed to the second condenser (or to a sequential set of condensers) which is kept at temperatures lower than that of the first one, and generally at sub-zero temperatures, so that they are condensed and withdrawn. From the acid-anhydride mixture as collected in the first condenser, the anhydride can be separated with conventional distillation steps, whereupon it is fed to the second reactor, which is structurally equal or similar to the first, and is kept under the same degree of vacuum, but preferably at a temperature of 500° to 700°C and without any catalyst.

The emerging vapors are caused to pass through a first condenser which is kept at such a temperature as to condense the unreacted anhydride and the acid formed in the reaction (generally at temperatures above zero centigrade) and the vapors issuing from this condenser are sent to one more additional condensers which are kept at lower temperatures, below zero centigrade, wherein the expected final product, that is, the ketene, is collected.

The conversion ratios as obtained in the first stage (first reactor) and, where it exists, also in the second stage (second reactor) are, as a rule, in the order of 60–80 percent, sometimes even higher (about 80–90 percent). The yields are generally very high, about 85–95 percent, and very often they approach the theoretical values. The purity of the ketene thus obtained is extremely satisfactory and is in the order of 96–99 percent. The method of the invention can be carried out both as a batch process by adopting the two stages, and as a continuous run according to the most updated techniques of this field.

In the light of the foregoing, it should be noted that the anhydride of the alicyclic acid concerned, possibly prepared with methods other than the one described above, can be, in itself, the starting material of the method according to the invention: if so, the mode of operation will be, preferably, the one described hereinabove for the second stage, which takes place in the second reactor and the subsequent condensers. According to what has been ascertained by the applicants, the novel catalyst consisting of alkyl esters of the selenophosphoric acid has given particularly satisfactory results.

By using such a catalyst, very high yields and conversion ratios have been obtained, the conversion rates attaining even 80–90 percent.

In order that the invention may be further illustrated, a few examples of practical use will be described, these being in no wise intended as limitations of the modes of operation and the details used in carrying out the invention.

EXAMPLE 1

A 3-meter copper tube having a diameter of 8mms. is heated to a temperature of 640°–660°C and fed, under a pressure of 20 Torr and at a rate of flow of 300 grms. an hour, with 912 grms. of hexahydrobenzoic acid (97.2% purity), supplemented with 1% of triethylselenophosphate as a catalyst. On completion of the reaction, the gases are caused to pass through a condenser kept at 60°C where 345.6 grms. of hexahydrobenzoic acid, and 483.26 grms. hexahydrobenzoic acid anhydride are collected along with small amounts of by-products. In subsequently placed traps, kept at temperatures lower than zero centigrade, 38 grms. of water are collected together with about 40 grms. of low-boiling by-products. The conversion ratio is 61% and the yield of the converted product is 96%. The thusly obtained anhydride is concentrated by distillation until obtaining an anhydride having a purity of 96.63% and the 2% by weight of hexahydrobenzoic acid. 1,117 grams of the anhydride are then fed to a copper reactor similar to the first reactor and kept at 525°C, with a rate of flow of 360 grms. an hour under a pressure of 20 Torr. The emerging gases are caused to pass through a first condenser kept at 60°C wherein 326.06 grms. of anhydride are collected along with 427.76 grms. of acid, plus a small amount of by-products. In a second condenser, kept at minus 40°C, serially arranged with respect to the first one, 349 grms. of pentamethyleneketene are collected, the conversion ratio for the second stage being as high as 70%, and the yield of converted product is virtually quantitative.

EXAMPLE 2

A tube made of special chromium-steel (exempt of nickel) having a diameter of 16 mms. and a length from 1 to 3 meters is heated to a temperature of 640°–660°C and fed, under a pressure of 20 Torr and with a rate of flow of 300 grms. an hour, with 895 grms. of hexahydrobenzoic acid (97.2% purity) containing 0.5% by wt. of triethylselenophosphate. The emerging gases are cooled in a first condenser kept at 60°C and in sequentially arranged traps kept at subzero temperatures. One obtains 117.53 grms. hexahydrobenzoic acid, 378.10 grms. hexahydrobenzoic acid anhydride, 36 grms. water and the balance consisting of by-products. The yield of the reaction is 90%, the conversion ratio is 52%.

The anhydride thus obtained is concentrated up to 96.63% by distillation. This anhydride contains 2% of acid, and 1,108 grms. of this anhydride is fed at a rate of flow of 360 grms. an hour, to a second reactor, similar to the first, heated to 575°C under a pressure of 20 Torr. Downstream of the reactor, one obtains in the condensers like the ones of Example 1, 287.98 grms. of anhydride, 426.22 grms. of acid, 18 grms. of by-products, and 347.42 grms. of pentamethyleneketene, the yield of the second stage being 96% and the conversion ratio 73%.

EXAMPLE 3

The reactor described in Example 1 is fed, under a pressure of 20 Torr and at a rate of flow of 300 grams an hour, at a temperature of 700°C, with 930 grms. of hexahydrobenzoic acid (97.2% purity) supplemented by 1% of triethylselenophosphate. The outlet end of the reaction tube is fed with 0.1% of gaseous ammonia. On completion of this stage one obtains 114.62 grms. hexahydrobenzoic acid, 716.38 grms. anhydride, with a conversion ratio of 87% and a yield of 98%. The anhydride is purified and concentrated. It is obtained with a purity of 96.63% and contains 2% by wt. of hexahydrobenzoic acid. 940 grms. of the anhydride are fed, at a rate of flow of 300 grms. an hour, to a reactor similar to the one described in Example 1. The reactor is kept at a temperature of 575°C under a pressure of 20 Torr. One obtains 283.25 grms. of pentamethyleneketene, 235 grms. anhydride, 348.6 grms. of acid and a few grams of by-products. The conversion ratio is 74% and the yield of the converted product is 91%.

EXAMPLE 4

A copper reactor similar to the one described in Example 1 is fed, at a rate of flow of 300 grms. an hour, at a temperature of 640°–660°C and under a pressure of 20 Torr., with 902 grms. of hexahydrobenzoic acid (98.84% purity) supplemented by 0.3% by weight of triethylthiophosphate. Downstream of the reactor, one collects 553.04 grms. acid, 287.23 grms. anhydride and a few grams of by-products, the conversion ratio being 38% and the yield 91%. The acid-anhydride mixture feeds a distillation column, at whose head one obtains 510 grms. hexahydrobenzoic acid, whereas 330 grms. of 87% anhydride are obtained at the tail. Hexahydrobenzoic acid is recovered, and the anhydride is fed to a reactor similar to the first one, heated to a temperature to 590°–610°C and kept under a residual pressure of 40 mmHg, the rate of flow being 200 grms. an hour. On completion of the reaction, one obtains 101.5 grms. of hexahydrobenzoic acid, 139.5 grms. of hexahydrobenzoic anhydride and 41.4 grms. pentamethyleneketene, with a conversion ratio of 51% and a yield of 61% approx. Another test has been conducted, using an amount equivalent to the one specified above, but causing the distillation column to operate in a continuous run and feeding the anhydride continuously to the second reactor: the results thus obtained are fully equivalent to those obtained with the batch process method. The acid-anhydride mixture as obtained downstream of the first reactor feeds in a continuous stream the distillation column, at whose head one obtains the acid. This is recycled towards the first reactor, whereas the tail of the column feeds the second reactor. The acid-anhydride mixture obtained downstream of the second reactor is recycled to the distillation column at an appropriate level.

EXAMPLE 5

A reactor similar to the one of Example 1 is fed, at a rate of flow of 300 grms. an hour, at a temperature of 700°C and under a pressure of 20 Torr, with 883 grms. hexahydrobenzoic acid (98.84% purity) supplemented by 0.5% by wt. of triethylphosphate. One obtains 406.78 grms. acid, 369.79 grms. anhydride, 45 grms. water and a few by-products, the conversion rate being 53% and the yield of the converted product 85%.

The thusly obtained anhydride can then be converted into a ketene according to one of the methods described above.

EXAMPLE 6

A tubular copper reactor similar to the one described in Example 1 is heated to a temperature of 630°–650°C and fed, under a pressure of 20 Torr, at a rate of flow of 360 grms. an hour, with 984 grms. of hexahydrobenzoic acid (99.83% purity), supplemented by 0.3% by weight triethylthiophosphate. At the reactor outlet the gases are supplemented by 0.05% to 0.1% of gaseous ammonia and abruptly cooled to 75°–80°C.

Under these conditions the unreacted acid is condensed together with a small amount of the anhydride. In a second condenser, kept at sub-zero temperatures, pentamethyleneketene is collected together with water in the form of ice. One obtains 195 grms. of acid, 50 grms. of anhydride, 628 grms. of pentamethyleneketene and more than 100 grms. ice, the conversion ratio being 80% and the yield of the converted product 93%.

EXAMPLE 7

A tubular copper reactor similar to the one described in Example 1, heated to a temperature of 650°–670°C, is fed under a pressure of about 20 Torr. and at a rate of flow of 400 g/h, with 1200 grs. of cyclododecancarboxylic acid (98.5% purity) kept molten by means of an oil-circulating jacket at a temperature of 110°C; the molten acid is supplemented by 0.2% by weight of biethylthiophosphate. At the reactor outlet the gases are supplemented by 1% of gaseous $NH_3$ and abruptly cooled to 120°C. The unreacted acid and its anhydride are thus recovered, while the ketene and water vapours are condensed at sub-zero temperatures. One obtains 390 grs. of acid, 30 grs. of anhydride, 610 grs. of cycloundecamethylenketene and 90 grs. of $H_2O$, the conversion ratio being 67% and the yield of converted product 88.8%.

EXAMPLE 8

A tubular copper reactor similar to the one described in Example 1, heated to a temperature of 650°C, is fed, under a pressure of 20 Torr. and at a rate of flow of 350 g/h, with 1,000 grs. of cyclo-octancarboxylic acid (98% purity), kept molten by means of a water-circulating jacket at a temperature of 75°–80°C; the molten acid is supplemented by 0.25% by weight of triethylthiophosphate. At the reactor outlet the gases are supplemented by about 1% of gaseous ammonia and abruptly cooled to 100°C. The unreacted acid and its anhydride are thus recovered, while the ketene and water vapours are condensed at sub-zero temperatures. One obtains 245 grs. of acid, 35 grs. of anhydride, 575 grs. of cycloheptamethyleneketene and 70 grs. of $H_2O$, with a conversion of 75% and a yield of converted product of about 89%.

What is claimed is:

1. A method for the production of alicyclic ketenes comprising heating a compound selected from the group consisting of hexahydrobenzoic acid and hexahydrobenzoic acid anhydride at a temperature between 550° and 750°C and at a pressure of about 20 Torr. in a vessel made of copper or of a steel which contains no nickel, and fractionally condensing the gases and vapors obtained to recover cyclopentamethyleneketene.

2. A method for producing an alicyclic ketene comprising heating hexahydrobenzoic acid to a temperature between 630° and 700°C in a copper tube or chromium steel reactor free of nickel under a pressure of 20 Torr. in the presence of a catalyst selected from the group consisting of triethylselonophosphate, triethylthiosphate and triethylphosphate in an amount of 0.3 to 1% by weight, condensing the gases from the reactor tube at a temperature of 60°C to collect a mixture of hexahydrobenzoic acid and hexahydrobenzoic acid anhydride, separating the acid anhydride from the acid, concentrating the anhydride until an anhydride having a purity of 96.63 and 2% of hexahydrobenzoic acid by weight is obtained, feeding the anhydride to a second copper reactor similar to the first reactor at a temperature of 525° to 610°C and a pressure of 20 Torr, passing the gases emerging from the second reactor through a first condenser kept at a temperature of 60°C., and passing the gases from the first condenser into a second condenser kept at minus 40°C to collect therein pentamethyleneketene.

3. A method according to claim 2, wherein the outlet end of the first reactor is fed with gaseous ammonia in an amount of 0.05 to 1% by weight of the starting acid before condensing the mixture.

4. A method according to claim 2, wherein the mixture from the first reactor is fed to a distillation column and the hexahydrobenzoic acid is collected from the top of the column and the anhydride is obtained at the tail of the column.

5. A method according to claim 4, wherein the acid from the head of the distillation column is recycled to the first reactor and the anhydride from the tail of the column is fed to the second reactor, and the acid-anhydride mixture obtained downstream of the second reactor is recycled to the distillation column.

* * * * *

UNITED STATES PATENT OFFICE
CERTIFICATE OF CORRECTION

Patent No. 3,914,313          Dated October 21, 1975

Inventor(s) Giancarlo Sioli, Luigi Giuffré, Franco Righi and Giancarlo Matera

It is certified that error appears in the above-identified patent and that said Letters Patent are hereby corrected as shown below:

On the front page, column 1, between INID numbers [21] and [52] insert:

-- [30]        Foreign Application Priority Data

February 27, 1970    Italy...........21264 A/70 --

Signed and Sealed this thirteenth Day of April 1976

[SEAL]

Attest:

RUTH C. MASON
*Attesting Officer*

C. MARSHALL DANN
*Commissioner of Patents and Trademarks*